United States Patent Office 3,574,662
Patented Apr. 13, 1971

3,574,662
METHOD OF DEPOSITING POLYMERIC
MATERIALS ON SUBSTRATES
John R. Gage, Stow, Ohio, assignor to The Goodyear
Tire & Rubber Company, Akron, Ohio
No Drawing. Filed Dec. 29, 1967, Ser. No. 694,373
Int. Cl. B44d 1/094, 1/12
U.S. Cl. 117—27                              2 Claims

ABSTRACT OF THE DISCLOSURE

A method of depositing a polymeric material on the surface of a substrate by applying an aqueous suspension of a polymeric material to the substrate surface and simultaneously precipitating the said polymeric material and removing the water portion from the suspension with a water absorbing material.

This invention relates to a method of depositing polymeric materials from suspensions onto substrate surfaces and to polymeric structures formed therefrom.

Heretofore various polymeric materials have been deposited on substrate surfaces to form polymeric layers on the substrate by coating such substrate surfaces with aqueous suspensions of rubber-like polymeric materials, such as their aqueous emulsions, and precipitating or coagulating the polymeric materials from the suspensions with coagulating chemicals or by air drying. The thickness of such polymeric layers is limited by the amount of the polymeric material contained in the suspension. Therefore, unless special thickeners are added to the suspensions, only relatively thin layers of polymeric materials can be applied to substrates because of the relatively low or medium solids content of the aqueous suspensions. The thickness of such polymeric layers can be built up by applying multiple coats of suspensions of the polymeric materials. However, considerable construction time is used because of the time consuming steps of precipitating or coagulating the polymeric materials from the suspensions and evaporating the water portion from the precipitated polymeric material before applying the next coat of the suspension. Additionally, unless special thickeners or leveling agents are used, the suspensions tend to flow excessively over the surface of the substrate when thick suspension coatings are applied, and when the polymeric materials are precipitated from the suspension, the water portion flows excessively and even tends to carry the precipitated polymeric material with it.

Therefore it is an object of this invention to provide an improved method of depositing polymeric materials on substrates from aqueous suspensions without requiring the use of coagulating chemicals and to provide polymeric structures prepared therefrom.

In accordance with this invention it has been found that an improved method of depositing a layer of polymeric material on the surface of a substrate comprises applying an aqueous suspension of a polymeric material to the substrate surface and simultaneously precipitating the said polymeric material and removing the water portion form the suspension with a water absorbing material. In the practice of this invention the preferred method comprises applying a coating of the aqueous suspension of polymeric material on the substrate surface and applying a sufficient amount of water absorbent to the coating to simultaneously precipitate the polymeric material and absorb the water portion of the suspension. It has further been found that a method of enhancing the thickness of the said polymeric layer comprises treating the suspension coating with a particulate polymer material and a sufficient amount of water absorbent to simultaneously precipitate the said polymeric material and remove the water content of the suspension. The term "precipitating" is used in this specification to broadly include coagulating a rubber-like material from an aqueous emulsion or latex.

In the preferred practice of this invention a flexible polymeric layer is formed on the substrate surface from an aqueous emulsion of a rubber-like material such as a rubber latex and the particulate polymer material, when used, is a particulate rubbery material.

Water absorbing materials useful in this invention are powdery inorganic materials essentially insoluble in rubber and water which have a water absorbency of at least one gram of water per gram of absorbing material. The preferred materials have an absorbency of at least two and usually 3 or 4 more grams per gram. It is desired that the powdery absorbing materials have an average particle size smaller than about a 20 mesh size and usually from about a 500 to about a 100 mesh size as determined by U.S. Standard screen tests.

Representative examples of various water absorbing materials are silica gel, molecular sieves, calcium silicate, aluminum oxide, magnesium oxide, magnesium sulfate, calcium oxide, calcium sulfate, calcium chloride, various clays, diatomaceous earths and products prepared by the hydro-thermal reaction of diatomaceous earth with a source of calcium such as calcium oxide, such as the product obtainable as Micro-Cel from The Johns-Manville Company.

Absorbency of the powders is determined by titration of a 1 to 6 gram sample of the powder in a 200-milliliter round bottom flask. The size of the sample varies with the density of the powder. With the high density powders 6 grams of the powder is used for the titration but where the density is low then only 1 gram of powder should be used. The actual weight of the powder used is determined and then water is added from a buret in small increments usually about a half to one-tenth of a milliliter at a time. After the addition of each increment of water the flask is rotated so that the portion of the powder which has been wetted, forms a ball which rolls around on top of the unwet powder, and then further increments of water are added to the ball and the flask again is rotated to pick up more dry powder onto the ball. The end point of titration is the point at which the ball has picked up all of the free powder in the flask. Usually a drop or two more of the liquid will make the ball sufficiently wet to smear the inside of the flask. From the amount of water added and the weight of the sample the water absorption of the powder is calculated as grams of water added per gram of powder.

The water absorbency of some commercial powders of the diatomaceous earth and clay types useful in this invention are given in Table I:

TABLE I

| Powder | Absorbency, grams water per gram | Density, loose weight, Lbs./Cu. ft. |
|---|---|---|
| Micro-Cel: A | 4.25 | 7.5 |
| B | 2.40 | 14.5 |
| C | 4.25 | 7.5 |
| E | 4.70 | 4.5 |
| Celite #292 [1] | 2.0 | |
| Bentonite | 1.20 | |
| Fuller's earth | 1.1 | |

[1] A diatomaceous earth obtained from The Johns-Manville Company.

A particularly desirable type of water absorbing powdery material is a powdery free-flowing unvulcanized rubber composition of the type described in U.S. Pat. 3,345,323 which is generally prepared by (1) controllably adding a latex having a rubbery content of at least about 35 percent by weight to an inorganic powdery material having a water absorbency of at least one gram per gram; (2) mixing the powdery material in contact with the latex with more powdery material to maintain the free-flowing powdery nature throughout the mixture; (3) continuing this controlled addition and mixing until the amount of latex absorbed on all the powdery material is sufficient to yield a loose, mealy powder containing at least 60 percent by weight of rubber but insufficient to yield a pasty adhering mass, and (4) then removing the absorbed water to obtain the mixture as a dry powder containing at least sixty percent by weight of rubber.

Aqueous suspensions of various rubber-like materials can be used in the practice of this invention to form the polymeric layers such as the emulsions generally known as latices. Also, various particulate rubbery materials can be added to the suspension coatings such as those having an average mesh size of less than about 20 and preferably from about 50 to about 200. Representative examples of rubbery or rubber-like materials are natural rubber and various synthetic rubbers such as polymers of conjugated dienes including polybutadiene, polyisoprene, copolymers of butadiene and isoprene which contain a major portion of butadiene, particularly copolymers of butadiene and styrene of the hot and cold SBR type which contain from about 60 to about 90 percent by weight of butadiene, copolymers of butadiene and acrylonitrile, butyl rubber, which is a polymerization product of a major portion of a mono-olefin such as isobutylene and a minor portion of a diolefin such as butadiene or isoprene, copolymers of ethylene and propylene, and terpolymers of ethylene, propylene and a minor portion of a nonconjugated diene.

Thus, for example, various natural rubber and synthetic rubber latices can be used in this invention. Representative synthetic rubber latices are the aqueous emulsion polymerizates of 1,3-butadiene and styrene wherein the polymerizates contain from about 60 to about 90 percent by weight units derived from 1,3-butadiene; aqueous emulsion polymerizates of butadiene and acrylonitrile wherein the polymerizates contain from about 40 to about 80 percent by weight units derived from 1,3-butadiene; and aqueous emulsion polymerizates of 1,3-butadiene and of isoprene.

Suitable aqueous suspensions and latices for this invention can contain from about 30 to about 70 percent by weight solids although preferably the emulsions contain from about 50 to about 70 percent by weight solids. It is understood that various emulsifiers, and other additives such as carbon black, accelerators and antioxidants normally used by those skilled in the art may also be used in the suspensions or emulsions.

The method of this invention can be practiced by depositing polymeric layers on flat, concave and convex substrate surfaces which will adhere to the deposited polymeric layers to form integral structures and also on surfaces which will not tightly adhere to the deposited polymeric layers such as building forms to shape the polymeric layers and form shaped polymeric structures. Exemplary of some of the many various substrates are solid metals, wood, cardboard, paper, glass, thermoplastic polymers, thermoset polymers, rubber and rubber-like materials such as those hereinbefore described. The substrates can be various fabrics such as nonwoven and textile fabrics such as those produced from various yarns and those produced from continuous filaments by processes known in the art. For example, the fabrics can be prepared from polyamides such as nylon, from polyesters, from cellulose and cellulose derivatives such as cotton and rayon, and from wire and glass. The fabrics can have various weights such as of from less than about 0.5 to about 15 ounces per square yard or higher.

If desired, the substrate surfaces can be coated with various release agents to prevent the deposited flexible material from tightly adhering thereto, such as polyethylene and polypropylene and the many releasing agents or parting agents known to those skilled in the art which include the polyethylene and polypropylene waxes and various other waxes.

The following examples further illustrate the invention and are not intended to be limitative. In these examples the parts and percentages are by weight unless otherwise indicated.

EXAMPLE I

Built-up layers of several types of rubber were deposited on lacquer coated papers and tested by the following procedure, the results of which are summarized in Table A.

About 80 parts of a rubber latex was spray coated onto the surface of a lacquer coated paper (obtained as Hiding Power Chart Paper Form 04 from The Morest Company). Over the latex coat at about 25° C. was evenly dusted about 50 parts of a free flowing dry rubber composition having a U.S. Standard mesh size of about 100 which is comprised of about 20 weight percent of Micro-Cel E and about 80 weight percent of a butadiene-styrene rubber containing about 23 weight percent units derived from styrene. The dry rubber composition simultaneously coagulated the rubber and absorbed the water content of the latex to form a layer comprised of the rubber and the rubber composition. After about one minute, 80 parts of a second spray coat of the rubber latex was applied over the first layer and 50 parts of the free flowing dry rubber composition was evenly applied over the second latex coat at about 25° C. The dry rubber composition simultaneously coagulated the rubber and absorbed the water content of the second latex coating to form a second layer comprised of the rubber and the rubber composition adhered to the first deposited layer. A built-up layer of the rubber and rubber composition comprising four of these successive coatings was prepared in this manner. The built-up layer was then first dried at about 25° C. for about 16 hours and then at about 60° C. for one hour to form a rubbery, flexible layer on the surface of the lacquer coated paper having a thickness of about 0.07 inch. The deposited layer was removed from the lacquer coated paper and tested for percent volume change after immersion in isooctane at 25° C. (1⅝ inch discs were measured according to water displacement Test Method 6211 of Federal Method Standard 601) and also tested for tensile strength (pounds per square inch) with an Instron Tester at a two inches per minute crosshead speed.

Built-up layer I was prepared from a butadiene-styrene latex having a 69 weight percent solids content where the rubber contained about 23 weight percent units derived from styrene, and from the butadiene-styrene rubber-Micro-Cel E composition prepared by spraying a butadiene-styrene latex having a 69 percent solids content into the top of a forced air drying chamber operating at about 60° C. and directing a powdery Micro-Cel E into the spray followed by drying the rubber composition.

Built-up layer II was prepared from the butadiene-styrene latex and the rubber composition where the rubber composition was prepared according to the method described in U.S. Pat. 3,345,323.

Built-up layer III was prepared from the latex and rubber composition used for layer I except that a small amount of sulfur curative was added to the latex and the built-up layer was cured after the drying step at about 100° C. for 30 minutes.

Built-up layer IV was prepared with a low ammonia natural latex having a solids content of about 53 percent, the rubber composition of layers I and III, and a small amount of a sulfur curative was added to the latex. The built-up layer was cured after the drying step at about 100° C. for 30 minutes.

Built-up layer V was prepared from a butyl rubber latex having a 56 percent solids content and the rubber composition used in layers I, III, and IV.

TABLE A

| Tests | Built-up layers | | | | |
|---|---|---|---|---|---|
| | I | II | III | IV | V |
| Percent volume change: | | | | | |
| After 3 minutes | 23 | 20 | 33 | 60 | 49 |
| After 15 minutes | 53 | 42 | 47 | 139 | 165 |
| Tensile strength, p.s.i. at 100% elongation | 58 | 50 | 98 | 96 | 34 |

Because of their unusually high rate of volume increase, the built-up layers have been formed to have particular utility as liners or as a barrier material in structures used for containing volatile and flammable liquids such as hydrocarbons and gasoline which are subject to punctures. Upon a puncturing of the container they tend to rapidly swell and seal the punctures, thus preventing harmful leakage of volatile and flammable liquids.

Although in this example the various latices are treated by dusting a water absorbant over a latex coating the method of this invention is also directed to treating a latex to deposit a rubber-like polymer on a substrate by applying the latex and a water absorbent substantially simultaneously to the substrate such as, for example, by spray coating.

While certain representative embodiments and details have been shown for the purpose of illustrating the invention, it will be apparent to those skilled in this art that various changes and modifications may be made therein without departing from the spirit or scope of the invention.

What is claimed is:

1. A method of depositing a rubbery material on the surface of a substrate which comprises applying a rubber latex to the substrate surface and simultaneously coagulating the said rubber latex and removing the water portion from the latex with a free-flowing water absorbing material where the said water absorbing material is from about a 50 to about a 200 mesh size powdery unvulcanized rubber composition comprising rubber and an inorganic powdery material of from about a 100 to about a 500 mesh size having a water absorbency of at least one gram per gram, where the said free-flowing water absorbing material contains at least 60 percent by weight of rubber, where the said rubber of the rubber latex and of the water absorbing material are individually selected from at least one of the group consisting of natural rubber, butadiene-styrene copolymers, butadiene-acrylonitrile copolymers, butyl rubber, polybutadiene and polyisoprene, where the said inorganic powdery material is selected from at least one of the group consisting of silica gel, molecular sieves, calcium silicate, aluminum oxide, magnesium oxide, magnesium sulfate, calcium oxide, calcium sulfate, calcium chloride, clays, diatomaceous earths, and products prepared by the hydrothermal reaction of a diatomaceous earth with a source of calcium such as calcium oxide and where the said free-flowing water absorbing material is prepared by (A) controllably adding a latex having a rubbery content of at least about 35 percent by weight to an inorganic powdery material having a water absorbency of at least one gram per gram;

(B) mixing the inorganic powdery material in contact with the latex with more powdery material to maintain a free-flowing powdery nature throughout the mixture;

(C) continuing this control addition and mixing until the amount of latex absorbed on the powdery material is sufficient to yield a loose powder containing at least 60 percent by weight of rubber but insufficient to yield a pasty adhering mass; and (D) removing the absorbed water to obtain the mixture as a dry powder.

2. The method according to claim 1 where the rubber latex contains from about 50 to about 70 percent by weight solids and is aqueous emulsion polymerizates of 1,3-butadiene and styrene containing from about 60 to about 90 weight percent units derived from 1,3-butadiene, butyl water latices or natural rubber latices; where the free-flowing water absorbing material is a powdery unvulcanized rubber composition comprising natural rubber, polybutadiene, polyisoprene, or copolymers of butadiene and styrene containing from about 60 to about 90 percent by weight of butadiene and where the inorganic powdery material of the said free-flowing water absorbing material is the product of the hydro-thermal reaction of diatomaceous earth with calcium oxide.

References Cited

UNITED STATES PATENTS

| 2,382,742 | 8/1945 | Patch | 260—746 |
| 2,493,381 | 1/1950 | Balassa | 117—62.2 |
| 2,501,839 | 3/1950 | Bodle et al. | 117—105.5 |
| 2,805,962 | 9/1957 | Hendricks | 117—62.2 |
| 3,257,229 | 6/1966 | Nielsen | 117—62.2 |
| 3,345,323 | 10/1967 | Endres et al. | 260—746 |

FOREIGN PATENTS

| 710,182 | 6/1954 | Great Britain | 117—105.5 |
| 235,888 | 6/1926 | Great Britain | 260—746 |

WILLIAM D. MARTIN, Primary Examiner

R. M. SPEER, Assistant Examiner

U.S. Cl. X.R.

117—16, 105.5, 163

PO-1050
(5/69)

UNITED STATES PATENT OFFICE
CERTIFICATE OF CORRECTION

Patent No. 3,574,662　　　　　　Dated April 13, 1971

Inventor(s) John R. Gage

It is certified that error appears in the above-identified patent and that said Letters Patent are hereby corrected as shown below:

Column 1, line 61, "form" should read -- from --.

Column 6, line 25, (Claim 2), "water" should read -- rubber

Signed and sealed this 9th day of November 1971.

(SEAL)
Attest:

EDWARD M. FLETCHER, JR.　　　　　ROBERT GOTTSCHALK
Attesting Officer　　　　　　　　　Acting Commissioner of Paten